United States Patent [19]

Pinard

[11] Patent Number: 5,249,222
[45] Date of Patent: Sep. 28, 1993

[54] HOST REMOTE SIGNALLING IN TELEPHONE SYSTEMS

[75] Inventor: Deborah L. Pinard, Kanata, Canada

[73] Assignee: Mitel Corporation, Katata, Canada

[21] Appl. No.: 878,526

[22] Filed: May 5, 1992

[30] Foreign Application Priority Data

Sep. 30, 1991 [CA] Canada ............................. 2052499

[51] Int. Cl.[5] .................................... H04M 7/00
[52] U.S. Cl. .................... 379/220; 379/224; 379/225; 379/229
[58] Field of Search ............... 379/219, 220, 221, 224, 379/225, 229, 234

[56] References Cited

U.S. PATENT DOCUMENTS

| | | | |
|---|---|---|---|
| 4,442,321 | 4/1984 | Stehman | 379/225 X |
| 4,488,004 | 12/1984 | Bogart et al. | 379/225 |
| 4,555,594 | 11/1985 | Friedes et al. | 379/220 |
| 4,602,363 | 7/1986 | Das et al. | 379/225 X |
| 4,757,526 | 7/1988 | Foster et al. | 379/229 X |
| 5,046,181 | 9/1991 | Higuchi et al. | 379/229 X |
| 5,163,042 | 11/1992 | Ochiai | 379/220 X |

Primary Examiner—James L. Dwyer
Assistant Examiner—Harry S. Hong
Attorney, Agent, or Firm—Malina & Wolson

[57] ABSTRACT

A special host routing code is transmitted from the remote switch to a host switch which advises the host switch whether the call is to be made to a subscriber local to the host switch or to a remote subscriber via an external telephone system trunk connected to the host switch. In the set up of a call, two steps are executed in addition to those of a normal switch-to-switch communication which functions to set up a path from the remote switch through, or to the host switch. These steps are the outpulsing of a host routing code from the remote switch over a specified trunk to the host switch and waiting for an acknowledgement, such as a wink (temporary line open or close condition). This causes the host switch to set up a cut-through path through the host switch, allowing the remote switch to tandem through the host switch. The digits dialed by subscribers on both switches to affect similar types of calls are therefore similar, and similar types of switches can be used for the remote and host switches.

7 Claims, 2 Drawing Sheets

HOST REMOTE SIGNALLING IN TELEPHONE SYSTEMS

FIELD OF THE INVENTION

This invention relates to telephone systems and in particular to an apparatus and method for utilizing a normal stand-alone switching system as a remote switching system associated with a host switching system whereby it can directly access trunks external to the host switching system.

BACKGROUND TO THE INVENTION

In the description below, the word "switch" is used to denote "switching system" and the nouns "table" and "form" are used to denote "data bits stored in a memory, configured so that they may be read as a table".

A normal stand-alone switch normally has station apparatus such as telephone sets and trunks connected to it, and functions to respond to digits or data received from the telephone sets or trunks to interconnect the telephone sets or trunks to specific telephone sets or incoming trunks to outgoing trunks, when used as a tandem switch. If there is a need for a remote switch to locally interconnect a group of telephone sets, in order to allow communication with the external telephone network, the remote switch is connected to a host switch by means of dedicated trunks which can have direct connections to trunks in the external network through the host switch when the subscriber connected to the remote switch dials a specific prefix number. The numbers dialed by the subscriber connected to the remote switch are therefore not the same as those dialed by a subscriber connected to the host switch, for outgoing calls. The remote switches are thus specialized and have a different design than the host, requiring the telephone company to purchase and maintain switches of different design, which is costly.

SUMMARY OF THE PRESENT INVENTION

In the present invention a remote switch can be of the same design as the host, thus reducing cost. However the system is designed so that the remote switch can have access to the trunks of the external switching system connected to the host as if they were connected directly to the remote switch. The remote switch appears to the subscriber connected to the remote switch, when dialing, as if it were the host switch. The numbers dialed by the subscriber connected to the remote switch are the same as those dialed by a subscriber connected to the host switch.

The subscriber connected to the remote switch thus can dial an outgoing call without special prefix digits designating that an outgoing trunk is to be seized. The system is therefore indistinguishable to a subscriber connected to the remote switch from the system used by a subscriber connected to the host switch.

In order to effect the above, a special host routing code is transmitted from the remote switch to the host switch which advises the host switch whether the call is to be made to a subscriber local to the host switch or to a remote subscriber via an external telephone system trunk connected to the host switch. In the set up of a call, two steps are executed in addition to those of a normal switch-to-switch communication which functions to set up a path from the remote switch through, or to the host switch. These steps are the outpulsing of a host routing code from the remote switch over a specified trunk to the host switch and waiting for an acknowledgement such as a wink (temporary line open or close condition). This causes the host switch to set up a cut-through path through the host switch, as will be described in more detail below, allowing the remote switch to tandem through the host switch.

According to an embodiment of the invention a method of processing calls between a pair of switching offices, wherein one is designated as a host switching office and the other is designated as a remote switching office, and wherein each has a stored signalling plan for execution when a request for service is invoked, is comprised of maintaining a remote route assignment form in memory in the remote switch from which a host routing code can be created which designates a type of call, a host termination number and a signalling plan, upon receipt of a request for service and dialed digits by the remote switch from a subscriber's line, accessing the remote route assignment form and receiving a corresponding host routing code, seizing a remote-host configuration trunk to the host switch, transmitting the host routing code to the host switch, checking the host routing code at the host switch to determine the type of call, providing an acknowledgement signal to the remote switch from the host switch, cutting an external trunk through the host switch to the remote switch in the event the call is not to be terminated by a line local to the host switch, and terminating the call on the line local to the host switch if the call is designated as a local call, and executing the signalling plan through the remote-host configuration trunk by the remote switch, whereby the call is processed with the remote switch in control of the signalling.

BRIEF INTRODUCTION TO THE DRAWINGS

A better understanding of the invention will be obtained by reference to the detailed description below, in conjunction with the following drawings, in which.

DETAILED DESCRIPTION OF PREFERRED EMBODIMENT

Figure 1:
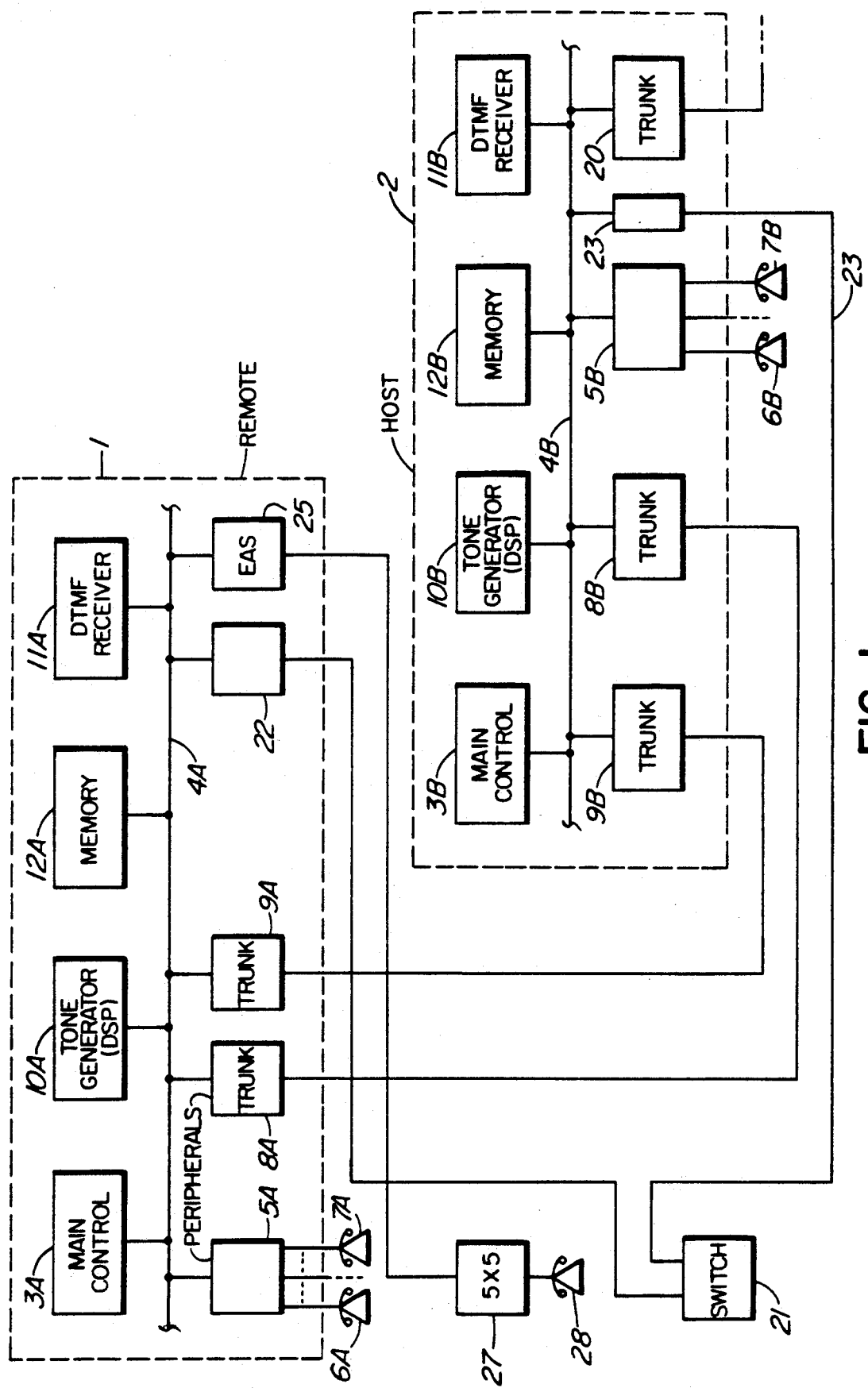
FIG. 1 is a block diagram of a system for providing the invention.

Turning now to FIG. 1, two identical switches are shown, a remote switch 1 and a host switch 2. Each switch is shown as being formed of a switching system which is representative, but which could take various forms.

The convention used below is to identify elements in the remote switch with a suffix A which are similar to those in the host switch, which are identified with a suffix B, although only the reference numerals without the suffixes will be referred to below for the sake of clarity of description and the avoidance of redundancy. The suffixes will be used when designating a specific element in a specific switch.

A main switch control 3 is connected to a main bus 4. Various peripherals such as representative line circuits 5, to which various telephone sets 6, 7 are connected, and trunks 8 and 9 are also connected to main bus 4. A tone generator 10, sometimes provided as a digital signal processor is connected to the bus 4, as well as a DTMF receiver 11 and an MF receiver (not shown). Memory 12 is also connected to the bus 4.

In normal operation, the main control senses seizure signals from the peripherals, receives signals from the peripherals which indicate what lines are to be connected to each other, or what trunks and lines are to be connected to each other, and performs the connection function. Various telephone systems use various ways of connecting the telephone lines or telephone line and trunks together, such as through circuit switches, time division channels, etc. The control program for operating the main control is usually stored in memory 12.

The particular structure and method that the switches use to interconnect calls is not of concern in this invention. However, the present invention can be usefully integrated with telephone switches sold by Mitel Corporation under the type No. GX5000 TM, and a description of its structure and operation in technical documentation provided with each such switch is incorporated herein by reference.

When a call from the remote switch or the host switch is to have an external destination, an outgoing trunk is to be seized. In order to provide information to the main control 3 which trunks are outgoing trunks and what signalling plan is to be used, in the prior art a form is stored in memory 12, which is an outgoing trunk group signalling plan assignment form. The form is accessed by the main control 3, and indicates to the main control which group of trunks are outgoing trunks and what signalling plan is to be used for them. The main control can then seize an outgoing trunk and signal according to the form accessed in memory 12.

Figure 2:
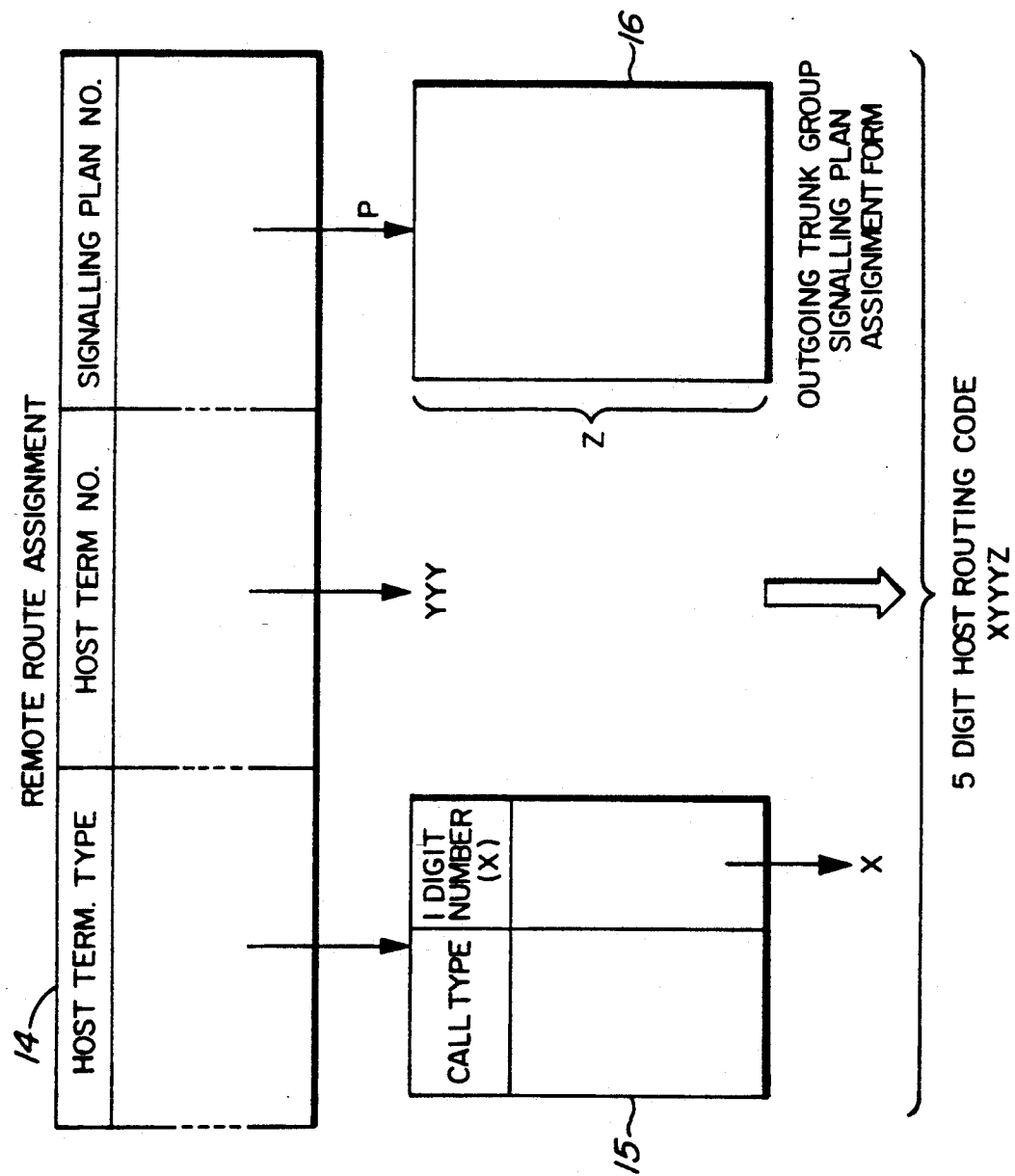
FIG. 2 is a diagram illustrating utilization of a memory in the remote switch, for implementing the invention.

Referring to FIG. 2, in accordance with the present invention, an additional form, referred to herein as a Remote Route Assignment 14, is also stored in memory 12A. There are three fields in this form, host termination type, host termination number and signalling plan number, the fields being used to instruct the main control as to how and what to out-pulse to establish a link either through or terminating on the host switch. The host termination type field stores data specifying the type of call, i.e. whether local or external to the host. The host termination number field stores data specifying a numeric value in the case of a call external to the host switch, and in the case of a call local to the host switch, this field remains blank.

The data programmed in the host termination type field indexes into a stored table 15 in memory 12A which returns an internal, one digit, numeric string (X). The host termination number is preferably a three digit number (YYY), which is added to the one digit string (X). The signalling plan number is a single digit string (Z) which indexes into a table stored in memory 12A labelled Outgoing Trunk Group Signalling Plan Assignment form 16, which correlates with a particular outgoing trunk group signalling plan referred to earlier. Z is the number of wait-to-wink instances found in signalling plan P.

The concatenation of these digits provide a five digit string XYYYZ.

In operation, a subscriber dials a digit string which, through digit translation in the switch under control of the main control, resolves to a remote route assignment form 14. The host routing code is thereby produced and the outgoing trunk group signalling plan assigned by form 16 is specified by the signalling plan number in the Remote Route Assignment form 14. The main control, receiving the signalling plan number and assigned signalling plan, controls the tone generator 10A to execute the particular types of signalling, required to fulfill by the designated signalling plan. The outgoing trunk 8A is seized in the usual manner.

On the host switch, when an outgoing trunk 8A on the remote switch, which is an incoming trunk 8B on the host switch, is seized, a known incoming trunk assignment form stored in memory 12B is accessed by the main control 3B having been alerted by the incoming trunk 8B peripheral that it requires service. The incoming trunk assignment form corresponding to that specific incoming trunk is then checked to determine if the appropriate field has been enabled. The incoming trunk assignment form is currently used in switching systems such as GX5000 TM to determine that the incoming trunk belongs to a particular incoming trunk group.

In the incoming trunk group assignment form, a new field is added, which identifies that the incoming trunk used for the remote-host switch tandem operation is a particular type of trunk which is utilized in the present invention, as distinguished from an ordinary incoming trunk or ordinary outgoing trunk. The designated type of trunk is referred to herein is a host-remote configuration trunk.

The host routing code is transmitted from the remote switch along the seized trunk to the host switch. If the incoming trunk of the host switch 2 has the appropriate incoming trunk group assignment (i.e. host-remote configuration), it interprets the host routing code by indexing into another table stored in memory 12B which transforms the code back to its original form, a termination type and number plus a signal digit number. Therefore the latter table is the host switch image of the remote route assignment form in the remote switch.

The last digit of the host routing code which has been transformed into its original form, represents the number of wink identifiers programmed in the outgoing group signalling plan. The host switch then uses the termination type and number to determine whether it should seize another route and send an acknowledgement back to the remote switch after the route has been seized, or to just send back an acknowledgement to the remote switch immediately. The last digit of the host routing code is not used until the signalling, identified by the signalling plan has been executed. The transformed last digit informs the host switch of the number of acknowledgements in the signalling plan to expect from the far end (system external trunk), and thus when to expect an answer (off-hook) acknowledgement.

In case the primary route from the remote switch to the host switch or subsequent route of a route list are all out of service, an alternate routing referred to as "backdoor" is provided. A new field can be added to the route assignment form 14 which permits the programming of the alternate route. This field is only used in the case in which all routes programmed in the route list fails in an out-of-service condition.

The following is an example of how the "backdoor" operation is used to enhance the reliability of a system switch. A remote switch I attempts to seize a subscriber peripheral 5B or trunk 20, etc. on an associated host switch 2. The dialed digits are translated in the remote switch to seize a route list from memory 12A and after further translation to specify a route, a trunk group and then a specific trunk 8A, an attempt is made to use the specified trunk to make a call to the host switch 2, but unfortunately the trunk 8A is out of service. An attempt to use all of the other trunks specified in the trunk group is made in a well known manner, and they in turn fail with an out of service condition. As a result, the route is indicated as failing with the same condition.

Since a route list was used to program this path, all other routes specified in the route list will be tried. If they in turn fail with the same condition a new field in the route list assignment form is used to inform the remote switch of an alternate route to seize. This alternate route should be programmed to seize a trunk which will route the call to a nearby remote switch 21 which in turn will route the call to the host switch 2 via trunk 23. This will be described in more detail below.

Of course it is of importance that the incoming trunk group assignment should be programmed correctly, and trunks should be properly labelled, since these identify a particular type of call specific to the host-remote configuration. It is this means of identification that the host or remote switch uses to determine the proper handling necessary to complete the request.

Detailed descriptions of five types of calls will now follow.

Subscriber on Remote Switch Calling Another Subscriber on Host Switch

A subscriber at telephone 6A (referred to below as subscriber 6A) dials digits to reach a subscriber 6B. The number dialed is translated by the main control 3A accessing memory 12A using the remote route assignment form 14. In this case the Host Termination Type field has the value LOCAL, and the Host Termination Number field will be BLANK. The Signalling Plan Number field, also in the Remote Route Assignment 14, is programmed to point to an entry in the Outgoing Trunk Signalling Plan assignment form 16. Trunk 8A is seized. This instance is programmed to outpulse the called number over outgoing trunk 8A, and wait for an answer acknowledgement.

The host routing code XYYYZ is now outpulsed to the host switch 2, and the remote switch 1 waits for an acknowledgement. The host routing code, as a result of the programming in the remote route assignment, will have a representative value of 10000. The first digit represents the termination type, the subsequent three digits represent the termination number, and the last digit represents the number of wink identifiers programmed in the outgoing trunk group signalling plan.

In the host switch, when an originating call is received from the incoming trunk 8B, the incoming trunk group assignment form against that specific incoming trunk stored in memory 12B is accessed under control of main control 3B, to determine if the appropriate field is enabled identifying if this trunk is part of the host-remote configuration. If the incoming trunk has the appropriate incoming trunk group assignment, then DTMF receiver 11B is connected to the trunk to receive the incoming digits.

When the incoming trunk 8B receives the host routing code the host switch interprets the host routing code by indexing into another database which transforms the code back to its original form, a termination type and number plus an additional digit. The host then uses this termination type and number to determine whether it should seize another route and send an acknowledgement back to the remote switch after the route has been seized or just send back an acknowledgement immediately.

In this example, since it is a local call to the host switch which must be processed, a wink acknowledgement is immediately sent back to the host switch by main control 3B controlling peripheral 8B. The acknowledgement is preferably a 120 msec wink.

The termination number field and the last digit field of the host routing code is not used in this case. In either case, before the acknowledgement is sent back to the remote switch the DTMF receiver is disconnected and an MF receiver (represented by DTMF receiver 11B) is connected in its place.

Once the wink acknowledgement is received by the remote switch, the steps listed in the signalling plan instance for this call are executed under control of main control 3B, in the normal manner, and eventually the subscriber 6B is seized.

Subscriber Call From Remote Switch Through Host Switch to External Telephone Network The number subscriber 6A has dialled is translated in main control 3A to a remote route assignment, in which the host termination type field has the value ROUTE and the host termination number field has the value e.g. 99. The signalling plan number field also in the remote route assignment is programmed to point to an entry in the outgoing trunk group signalling plan assignment form. That entry causes the main control 3A to cause outpulsing of the called number over the trunk 8A, wait for an answer acknowledgement and then outpulse ANI type I information.

However before this signalling plan is executed, two additional steps are invoked, the outpulsing of the host routing code to the host switch, and a wait for a wink acknowledgement.

The host routing code, as a result of the programming in the remote route assignment, has in this case the value of 20990, the first digit representing the termination type, the subsequent three digits representing the termination number, and the last digit representing the number of wink identifiers programmed in the signalling plan.

In the host switch, when a call origination is received on or on behalf of the incoming trunk, the incoming trunk group assignment form programmed against that specific incoming trunk is checked to determine if the appropriate field is enabled identifying this trunk as part of a host-remote configuration. If the incoming trunk has the appropriate incoming trunk group assignment, then DTMF receiver 11B is connected to the incoming trunk 8B to receive the incoming digits.

When the incoming trunk 8B receives the host routing code the host switch interprets the host routing code by indexing into another table in memory 12B corresponding to form 14 and the code is transformed to its original form, a termination type and number plus an additional digit. The host switch main control 3B then uses this termination type and number to determine whether it should seize another route and send an acknowledgement back to the remote switch after the route has been seized or to just send back an acknowledgement immediately. In this particular case since it is an external call, the host switch seizes an external trunk 20, pointed to by route 99. After the host switch has received an acknowledgement from trunk 20 it in turn sends an acknowledgement to the remote switch 1.

The last digit field of the host routing code is not used in this case. In either case, before the acknowledgement is sent back to the remote switch, the DTMF receiver is detached.

Once the wink acknowledgement has been received by the remote switch, the steps listed in the signalling plan instance are executed and eventually the call is placed over the network via trunk 20, directly from the remote switch 1 via trunk 8A, 8B and trunk 20.

Subscriber on Remote Switch Placing Call Over Network Through Host Switch to AT or Carrier Directly in Equal Access Environment A subscriber 6A dials a number which is translated to a remote route assignment as described above, where the termination type field has the value ROUTE in this case, and the host termination number field has a representative value 100. The signalling plan number field also in the remote route assignment is programmed to point to an entry in the outgoing trunk group signalling plan assignment form 16. This instance is programmed to outpulse the tandem code, to wait for a wink acknowledgement, to outpulse ANI type II data and the called number, wait for another wink acknowledgement, then wait for an answer acknowledgement wink.

However before this signalling plan is executed, the additional two steps are invoked, the outpulsing of the host routing code from the remote switch and a wait for a wink acknowledgement.

The host routing code, as a result of the programming in the remote route assignment, in this case has a value of 21002, the first digit representing the termination type, the subsequent three digits representing the termination number, and the last digit representing the number of wink identifiers programmed in the signalling plan.

In the host switch 2, when an origination is received from, or on behalf of, the incoming trunk 8B, the incoming trunk group assignment form programmed against that specific incoming trunk is checked to determine if the appropriate field is enabled identifying that this trunk is part of a host-remote configuration, as described earlier. If the incoming trunk has the appropriate incoming trunk group assignment, the a DTMF receiver 11B is connected to the incoming trunk 8B, to receive the incoming digits.

When the incoming trunk receives the host routing code, the host switch interprets the host routing code as described earlier by indexing a table which facilitates transformation of the code back to its original form, a termination type and number plus an additional digit as described earlier. The host switch then uses this termination type and number to determine whether it should seize another route and send an acknowledgement back to the remote switch after the route has been seized or to just send back an acknowledgement immediately. In this particular case since it is an external call, the host switch seizes the trunk represented by trunk 20, pointed to by route 100 and after the host switch has received the seize acknowledgement it in turn sends an acknowledgement to the remote switch. All fields in the host routing code are used in this case. In either case, before the acknowledgement is sent back to the remote switch, the DTMF receiver 11B is detached.

Once the wink acknowledgement is received by the remote switch the steps listed in the signalling plan instance are executed, and eventually the call is placed over the network, with the remote switch in control.

Link to Host Switch is Out of Service; Back Door Routing

A number dialed by subscriber 6A is translating to a route list assignment as described above, wherein the first route is chosen which in turn points to a remote route assignment where the host termination type field has the value LOCAL and the host termination number field is BLANK. The signalling plan number field also in the remote route assignment is programmed to point to an entry in the outgoing trunk group signalling plan assignment form. This instance is programmed to outpulse the called number over the trunk e.g. 8A and wait for an answer acknowledgement wink.

An attempt is then made to use the specified trunk to make a call to the host switch. If all of the trunks in the group are out of service the route will fail with an out of service indication to the main control 3A. Since a route list was used to program this path, all other routes specified in the route list will be tried in a well known manner. If they in turn fail with the same condition, it is preferred that a "back door" route to the host switch should be used. This requires the addition of another field, referred to as "out of service choice route" in the route list assignment form.

The alternate route specified in the form causes the main control 3A to seize a trunk which routes the call to a nearby remote switch 21. This alternate route should have the host termination type field in the remote route assignment form programmed to ROUTE LIST, and the host termination number field programmed to the route list number. The signalling plan number field also in the remote route assignment form should be programmed to point to an entry in the outgoing trunk group signalling plan assignment form.

This instance should be programmed to outpulse the called number over the alternate trunk 22 and wait for an answer acknowledgement. Trunk 22 is seized and a path to the remote switch 21 is established.

The originating remote switch 21 then executes the steps as specified in the signalling plan. However before this signalling plan is executed, two additional steps are invoked as described above, the outpulsing of the host routing code and the waiting for an acknowledgement wink.

The host routing code, programmed in the remote route assignment in this case has a value 30050, the first digit representing the termination type, the subsequent three digits representing the termination number, and the last digit representing the number of wink identifiers programmed in the signalling plan. The host routing code is then outpulsed to switch 21 and the originating remote switch 1 waits for a wink acknowledgement to begin executing the signalling protocol specified by the signalling plan number.

On remote switch 21, when an origination is received or on behalf of the incoming trunk, the incoming trunk group assignment form programmed against that specific incoming trunk is checked to determine if the appropriate field is enabled identifying that this group is part of the host-remote configuration referred to above. If the incoming trunk has the appropriate incoming trunk group assignment, then a DTMF receiver is connected to trunk 22 to receive the incoming digits. When the incoming trunk receives the host routing code, the remote switch 21 interprets the host routing code by indexing into a table which transforms the code back to its original form, a termination type and number plus an additional digit, as described earlier.

Remote switch 21 then uses this termination type and number to determine what should be done. In this particular case, a specific route list is used to create a path to the host switch 2, via incoming trunk 23. The last digit field of the host routing code is not used. The remote route assignment specified by the route list instance has the host termination type field programmed to LOCAL and the host termination number field programmed to BLANK. The signalling plan number field also in the remote route assignment should be programmed to BLANK since the originating remote switch 1 will be indicating the signalling plan to be used.

Remote switch 21 then proceeds to disconnect the DTMF receiver from the incoming trunk. The specified trunk 23 is seized and a path to the host switch 2 established. The second remote switch 21 then executes the embedded scheme to outpulse the host routing code and wait for a wink acknowledgement.

The host routing code as a result of the programming in the remote route assignment, in this case will have a value of 10000. The host routing code is then outpulsed.

Remote switch 21 does not wait for a wink acknowledgement from the host switch, nor does it generate a wink acknowledgement to the remote switch 1. The wink acknowledgement is forwarded from host switch 2 through remote switch 21 to remote switch 1. Once the wink is received the signalling pan specified in the primary remote switch 1 is executed.

If applicable, the number of wink identifiers programmed in the signalling pan on the remote switch 1 can be passed to the remote switch 21, and in turn passed to the host switch 2.

In the host switch 1, when an origination of a call is received on or on behalf of incoming trunk 23, the incoming trunk group assignment form programmed against that specific incoming trunk is checked to determine if the appropriate field is enabled identifying that this trunk is part of a host-remote configuration. If the incoming trunk has the appropriate incoming trunk group assignment, then DTMF receiver 11B is connected to trunk 23 to receive the incoming digits.

When the incoming trunk 23 receives the host routing code, the host switch interprets the host routing code, the host switch interprets the host routing code, indexing into a table which causes transformation of the code back to its original form, a termination type and number plus an additional digit. The host switch then uses this termination type and number to determine whether it should seize another route and send an acknowledgement back to the remote switch after the route has been seized or just send an acknowledgement immediately. In this particular case, since we are assuming that it is a local call to the host switch which is to be effected, an acknowledgement wink is immediately sent to the remote switch 21.

The termination number field and the last digit field of the host routing code are not used in this case. In either case, before acknowledgement is sent back to the remote switch the DTMF receiver 11B is detached and an MF receiver connected in its place.

When the wink acknowledgement is received by remote switch 21, it is forwarded to the original remote switch 1. Once received by the originating remote switch 1, the steps listed in the signalling plan specified on the original remote switch are executed. These address signals are passed transparently through the remote switch 21 to the host switch 2. Eventually subscriber phone 6B is seized.

Call From Remote Switch to Equipment on Step-By-Step Switch:

The number subscriber 6A dials is translated in remote switch 1 to seize a remote route assignment and after further translation to a trunk group and then to a specific trunk 25, which leads to a step-by-step switch 27. The remote route assignment has the host termination type field programmed to LOCAL and the host termination number field programmed to BLANK. The signalling plan number field also in the remote route assignment is programmed to point to an entry in the outgoing trunk group signalling plan assignment form. This instance is programmed to outpulse the called number over the specified trunk and to wait for an answer acknowledgement. An attempt is then made to use the specified trunk to make a call to the step-by-step switch 27. The trunk seized could be either an analog or digital trunk, since an extended area service (EAS) facility shown for example as part of trunk 25 can convert digital signals into analog form before outpulsing to the step-by-step switch 27.

In this case, since the trunk group type field in the remote route assignment is EAS, there is not any embedded address signalling schemes supported by the trunks specified. The remote switch 1 then commences to execute the steps in the signalling plan. Once the digits are received by the step-by-step switch, a subscriber phone 28 is seized in a well known manner.

It will be recognized that in the remote and host switches, the main control may be distributed, e.g. there may be controllers and memory associated with the peripherals. The various switching offices to which the present invention is applied need not be the specific configuration shown. The various forms described herein should of course be stored in memory which is accessible to the controller which implements the processing of the various calls.

A person understanding this invention may now conceive of alternative structures and embodiments or variations of the above. All of those which fall within the scope of the claims appended hereto are considered to be part of the present invention.

I claim:

1. A method of processing calls between a pair of switching offices, wherein one is designated as a remote switch, and the other is designated as a host switch, and wherein each has a stored signalling plan for execution when a request for service is invoked, comprising:
   (a) maintaining a remote route assignment form in memory in the remote switch from which a host routing code can be created which designates a type of call, a host termination number and the number of winks in a signalling plan;
   (b) upon receipt of a request for service and dialed digits by said remote switch from a subscriber's line, accessing the remote route assignment form and receiving a corresponding host routing code;
   (c) seizing a remote-host configuration trunk to the host switch;
   (d) transmitting the host routing code to the host switch;
   (e) checking the host routing code at the host switch to determine the type of call;
   (f) providing an acknowledgment signal to the remote switch from the host switch;
   (g) cutting an external trunk through the host switch to the remote switch in the event the call is not to be terminated by a line local to the host switch, or terminating the call on the line local to the host switch if the call is designated as a local call; and
   (h) executing the signalling plan through the remote-host configuration trunk by the remote switch, whereby the call is processed with the remote switch in control of signalling.

2. A method as defined in claim 1, in which the host routing code is a code formed of digits designating at least the type of call and signalling plan by characters representing addresses of tables, and further including the steps of looking up tables maintained in a memory in the host switch using said addresses, and retrieving full identifiers of the type of call and signalling plan from said tables maintained in the host switch, upon receipt of said host routing code from the remote switch.

3. A method as defined in claim 2 in which said acknowledgement signal is a wink.

4. A method as defined in claim 2 in which said acknowledgement signal is sent back to the remote switch after the host switch has determined that the call is to be terminated locally to the host switch.

5. A method as defined in claim 4 in which the acknowledgement signal is sent back to the remote switch after both that the host switch has determined that the call is to be terminated externally and not locally to the host switch and after the host switch has seized an external trunk.

6. A method as defined in claim 5 including the step of the host switch checking an incoming trunk assignment form maintained in a memory in the host switch after a trunk from the remote switch to the host switch has been seized by the remote switch, to determine whether the trunk is a remote-host configuration trunk, and if it determines that this is the case, assigning a DTMF receiver to the seized trunk to receive said host routing code.

7. A method as defined in claim 6 including the steps in said remote switch of seizing a trunk to another remote switch in the event that all remote-host configuration trunks to said host switch are out of service, and transmitting the remote routing code to said another remote switch, the remote routing code containing route instructions to process a call through said another remote switch to said host switch, said another remote switch interpreting the remote routing code and selecting and cutting through a remote-host configuration trunk to said host switch, whereby signalling between the original remote switch and the host switch can proceed via said another remote switch.

* * * * *